No. 801,896. PATENTED OCT. 17, 1905.
E. McDANIEL & W. R. McCALLISTER.
FENCE POST.
APPLICATION FILED JULY 27, 1905.
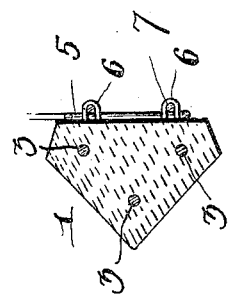
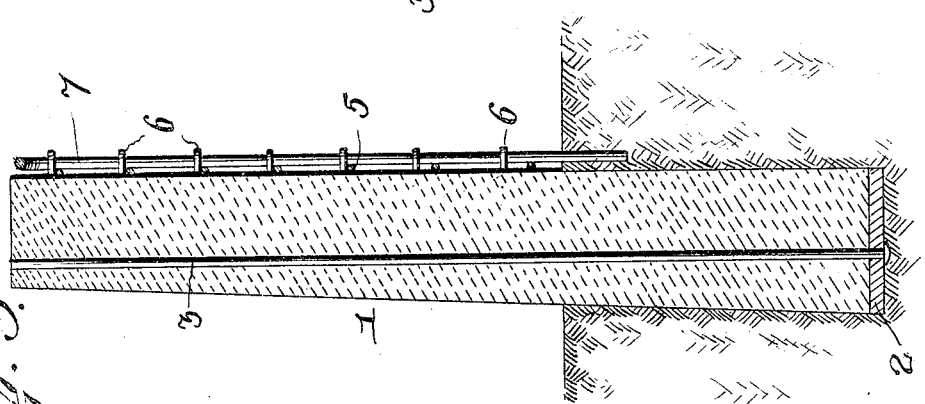
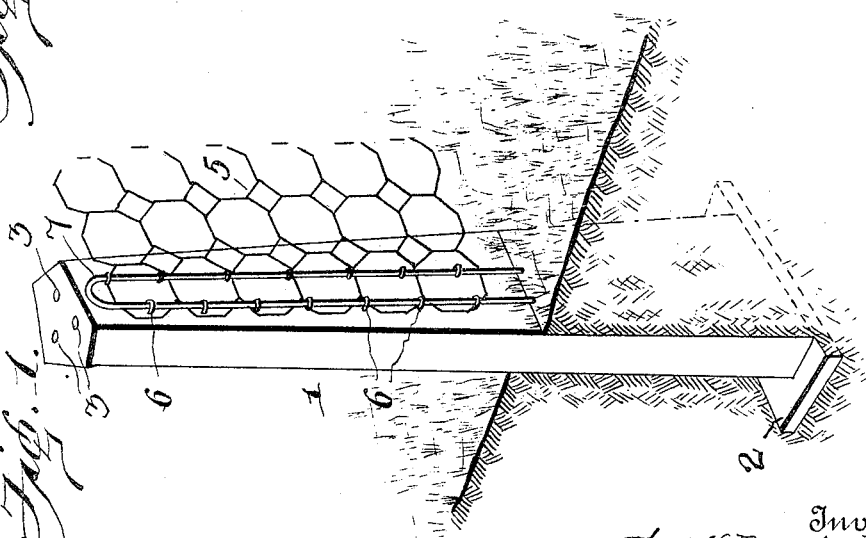
Witnesses
Jas. A. Koch
C. H. Griesbauer
Inventors
E. McDaniel
and W. R. McCallister
by H. B. Wilson
Attorney

UNITED STATES PATENT OFFICE.

ESEK McDANIEL AND WILLIAM R. McCALLISTER, OF PARIS, ILLINOIS.

FENCE-POST.

No. 801,896.  Specification of Letters Patent.  Patented Oct. 17, 1905.

Application filed July 27, 1905. Serial No. 271,499.

*To all whom it may concern:*

Be it known that we, ESEK McDANIEL and WILLIAM R. McCALLISTER, citizens of the United States, residing at Paris, in the county of Edgar and State of Illinois, have invented certain new and useful Improvements in Fence-Posts; and we do declare the following to be a full, clear, and exact description of the invention, such as will enable others skilled in the art to which it appertains to make and use the same.

Our invention relates to improvements in plastic fence-posts and in the means for fastening fence-wires thereto.

The object of the invention is to provide a device of this character which will be simple and comparatively inexpensive in construction, very durable in use, and well adapted for the purposes intended.

With the above and other objects in view the invention consists of certain novel features of construction, combination, and arrangement of parts, as will be hereinafter described and claimed.

In the accompanying drawings, Figure 1 is a perspective view of our improved fence-post, showing a piece of wire-netting secured thereto by our improved fastening means. Fig. 2 is a horizontal sectional view through the same, and Fig. 3 is a vertical sectional view.

Referring to the drawings by numeral, 1 denotes our improved fence-post which is molded from concrete, cement, or other plastic material. The post is of substantially triangular form in cross-section and tapers slightly from its lower end to its upper end. At its base or lower end is formed or provided an anchor 2, which, as shown, is of rectangular form, so that its ends or corners project outwardly and retain the lower end of the post in the ground. The post is strengthened by three longitudinally-extending wires or rods 3, which are embedded in the same adjacent to its corners or angles. These rods may be of any desired form and extend from the top of the post through its anchor 2.

In order to secure wire-netting 5 or other fencing-wire to the post, we embed in one of its faces a plurality of staples or loops 6 and provide a locking-key 7 to engage said staples or loops. The latter are preferably arranged in two vertical rows, as clearly shown in Fig. 1, and the key 7 is preferably in the form of a piece of wire or rod bent upon itself in U form. The staples or loops 6 are adapted to project through the openings or meshes in the fence-wire 5, so that the key 7, which is inserted in the outer ends of said staples or loops, will clamp the wire fence against the post, as clearly shown in Figs. 2 and 3 of the drawings.

The construction, use, and advantages of the invention will be readily understood from the foregoing description, taken in connection with the accompanying drawings. It will be seen that by making the posts in the form shown less material is required. The embedded wires or rods 3 materially strengthen the post, so as to limit the liability of its breaking, and the provision of the anchor 2 prevents all liability of the post loosening and working out of the ground by the action of the frost or other causes. It will also be noted that owing to the simple and durable construction of the post it may be manufactured at comparatively small cost and that the fencing-wires may be quickly and easily secured thereto or removed therefrom.

Various changes in the form, proportion, and the minor details of construction may be resorted to without departing from the principle or sacrificing any of the advantages of this invention.

Having thus described our invention, what we claim as new, and desire to secure by Letters Patent, is—

1. A fence-post having fence-wire-engaging eyes or loops projecting from one side thereof and arranged in longitudinal rows, and a U-shaped locking-key adapted to pass through said eyes or loops to secure wire fencing on the post, between the latter and said key.

2. A fence-post made of plastic material and having fence-wire-engaging eyes or loops embedded therein, projecting from one side thereof and arranged in longitudinal rows, and a U-shaped locking-key adapted to pass through said eyes or loops, to secure wire fencing upon said post, between the latter and said key.

In testimony whereof we have hereunto set our hands in presence of two subscribing witnesses.

ESEK McDANIEL.
WILLIAM R. McCALLISTER.

Witnesses:
HERRICK O. BOYER,
JOHN GOOD.